United States Patent
Sharp

(10) Patent No.: US 7,287,092 B2
(45) Date of Patent: Oct. 23, 2007

(54) GENERATING A HASH FOR A TCP/IP OFFLOAD DEVICE

(76) Inventor: Colin C. Sharp, 4335 Court Dr., Santa Cruz, CA (US) 95062

( * ) Notice: Subject to any disclaimer, the term of this patent is extended or adjusted under 35 U.S.C. 154(b) by 951 days.

(21) Appl. No.: 10/639,810

(22) Filed: Aug. 11, 2003

(65) Prior Publication Data

US 2005/0182841 A1   Aug. 18, 2005

(51) Int. Cl.
*G06F 15/16* (2006.01)
*H04L 12/56* (2006.01)

(52) U.S. Cl. ............... 709/245; 370/395.32; 707/3; 709/250

(58) Field of Classification Search .............. None
See application file for complete search history.

(56) References Cited

U.S. PATENT DOCUMENTS

| | | | |
|---|---|---|---|
| 5,414,704 A * | 5/1995 | Spinney | 370/389 |
| 5,524,250 A | 6/1996 | Chesson et al. | 712/228 |
| 5,598,410 A | 1/1997 | Stone | 370/469 |
| 5,619,650 A | 4/1997 | Bach et al. | 709/246 |
| 5,727,142 A | 3/1998 | Chen | 714/2 |
| 5,802,258 A | 9/1998 | Chen | 714/10 |
| 5,898,713 A | 4/1999 | Melzer et al. | 714/809 |
| 5,914,938 A * | 6/1999 | Brady et al. | 370/401 |
| 5,920,900 A * | 7/1999 | Poole et al. | 711/216 |
| 6,021,507 A | 2/2000 | Chen | 714/2 |
| 6,034,958 A * | 3/2000 | Wicklund | 370/401 |
| 6,047,323 A | 4/2000 | Krause | 709/227 |
| 6,223,172 B1 * | 4/2001 | Hunter et al. | 707/3 |
| 6,275,919 B1 * | 8/2001 | Johnson | 711/216 |

(Continued)

FOREIGN PATENT DOCUMENTS

EP      1 164 497 A1 * 12/2001
WO   PCT/US98/24943      3/2000

OTHER PUBLICATIONS

Internet pages entitled "Hash Function For Hash Table Lookup", by Robert J. Jenkins, http://burtleburtle.net/bob/hash, 19 pages, downloaded Jun. 19, 2003.

(Continued)

*Primary Examiner*—Patrice Winder
(74) *Attorney, Agent, or Firm*—Mark Lauer; Silicon Edge Law Group LLP

(57) ABSTRACT

A TCP/IP offload network interface device (NID) receives packets from a plurality of clients and generates, from the socket address of each such packet, a hash value. Each hash value identifies one of a plurality of hash buckets maintained on the NID. In a file server, certain socket address bits of the packets are low entropy bits in that they tend to be the same, regardless of which client sent the packet. Others of the socket address bits are high entropy bits. The hash function employed is such that the hash values resulting from the changing values of the high entropy bits are substantially evenly distributed among the plurality of hash buckets. In a fast-path, the NID uses a first hash function to identify TCBs on the NID. In a slow-path, the NID generates a second hash using a second hash function and a host stack uses the second hash.

21 Claims, 9 Drawing Sheets

U.S. PATENT DOCUMENTS

| | | | |
|---|---|---|---|
| 6,427,173 | B1 | 7/2002 | Boucher et al. ............ 709/238 |
| 6,580,712 | B1* | 6/2003 | Jennings et al. ............ 370/392 |
| 6,697,873 | B1* | 2/2004 | Yik et al. ................... 709/245 |
| 6,725,216 | B2* | 4/2004 | Davis et al. .................... 707/3 |
| 2002/0116527 | A1* | 8/2002 | Chen et al. ................. 709/245 |

OTHER PUBLICATIONS

Internet pages entitled "Minimal Perfect Hashing", http://burlteburtle.net/bob/hash, 6 pages, downloaded Jun. 19, 2003.

Internet pages entitled "Advantages of TCP/IP Offload ASIC", Adaptec, www.adaptec.com, 6 pages, downloaded Jan. 30, 2002.

U.S. Appl. No. 10/420,364 (including CD Appendix submitted with this form PTO-1449), 25 pages of text and 72 sheets of drawings, filed Apr. 22, 2003.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990, Protocol Engines Inc and Silicon Graphics Computer Systems.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984. RFC 929.

\* cited by examiner

GENERATING A HASH FOR A TCP/IP OFFLOAD DEVICE

CROSS-REFERENCE TO COMPACT DISC APPENDIX

Compact Disc Appendix, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BRIEF DESCRIPTION OF THE DRAWINGS

The present invention is illustrated by way of example and not limitation in the figures of the accompanying drawings, in which.

DETAILED DESCRIPTION

Figure 1:
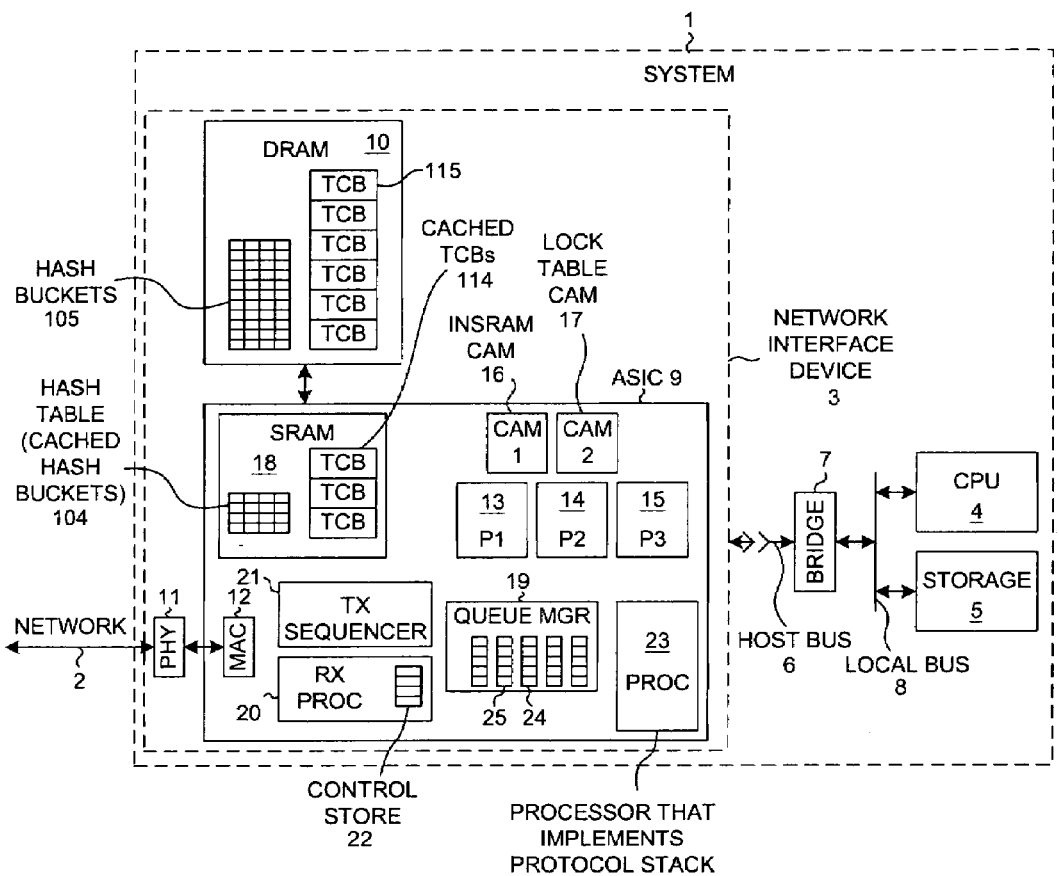
FIG. 1 is a diagram of a system 1 in accordance with one embodiment of the present invention.

FIG. 1 is a simplified diagram of a system 1 in accordance with a first embodiment. System 1 is coupled to a packet-switched network 2. Network 2 can, for example, be a local area network (LAN) and/or a collection of networks. Network 2 can, for example, be the Internet. Network 2 can, for example, be an IP-based SAN that runs iSCSI. Network 2 may, for example, be coupled to system 1 via media that communicates electrical signals, via fiber optic cables, and/or via a wireless communication channel. System 1 includes a network interface device (NID) 3 as well as a central processing unit (CPU) 4. CPU 4 executes software stored in storage 5. NID 3 is coupled to CPU 4 and storage 5 via host bus 6, a bridge 7, and local bus 8. Host bus 6 may, for example, be a PCI bus or another computer expansion bus.

In the illustrated particular embodiment, NID 3 includes an application specific integrated circuit (ASIC) 9, an amount of dynamic random access memory (DRAM) 10, and Physical Layer Interface (PHY) circuitry 11. NID 3 includes specialized protocol accelerating hardware for implementing "fast-path" processing whereby certain types of network communications are accelerated in comparison to "slow-path" processing whereby the remaining types of network communications are handled at least in part by a software protocol processing stack. In one embodiment, the certain types of network communications accelerated are TCP/IP communications. The embodiment of NID 3 illustrated in FIG. 1 is therefore sometimes called a TCP/IP Offload Engine (TOE).

For additional information on examples of a network interface device (sometimes called an Intelligent Network Interface Card or "INIC"), see: U.S. Pat. No. 6,247,060; U.S. Pat. No. 6,226,680; Published U.S. Patent Application No. 20010021949; Published U.S. Patent Application No. 20010027496; and Published U.S. Patent Application No. 20010047433 (the contents of each of the above-identified patents and published patent applications is incorporated herein by reference). System 1 of FIG. 1 employs techniques set forth in these documents for transferring control of TCP/IP connections between a protocol processing stack and a network interface device.

NID 3 includes Media Access Control circuitry 12, three processors 13-15, a pair of Content Addressable Memories (CAMs) 16 and 17, an amount of Static Random Access Memory (SRAM) 18, queue manager circuitry 19, a receive processor 20, and a transmit sequencer 21. Receive processor 20 executes code stored its own control store 22.

In some embodiments where NID 3 fully offloads or substantially fully offloads CPU 4 of the task of performing TCP/IP protocol processing, NID 3 includes a processor 23. Processor 23 may, for example, be a general purpose microprocessor. Processor 23 performs slow-path processing such as TCP error condition handling and exception condition handling. In some embodiments, processor 23 also performs higher layer protocol processing such as, for example, iSCSI layer protocol processing such that NID 3 offloads CPU 4 of all iSCSI protocol processing tasks. In the example of FIG. 1, CPU 4 executes code that implements a file system, and processor 23 executes code that implements a protocol processing stack that includes an iSCSI protocol processing layer.

Overview of One Embodiment of a Fast-Path Receive Path:

Operation of NID 3 is now described in connection with the receipt onto NID 3 of a TCP/IP packet from network 2. DRAM 10 is initially partitioned to include a plurality of buffers. Receive processor 20 uses the buffers in DRAM 10 to store incoming network packet data as well as status information for the packet. For each buffer, a 32-bit buffer descriptor is created. Each 32-bit buffer descriptor indicates the size of the associated buffer and the location in DRAM of the associated buffer. The location is indicated by a 19-bit pointer.

At start time, the buffer descriptors for the fee buffers are pushed onto on a "free-buffer queue" 24. This is accomplished by writing the buffer descriptors to queue manager 19. Queue manager 19 maintains multiple queues including the "free-buffer queue" 24. In this implementation, the heads and tails of the various queues are located in SRAM 18, whereas the middle portion of the queues are located in DRAM 10.

The TCP/IP packet is received from the network 2 via Physical Layer Interface (PHY) circuitry 11 and MAC circuitry 12. As the MAC circuitry 12 processes the packet, the MAC circuitry 12 verifies checksums in the packet and generates "status" information. After all the packet data has been received, the MAC circuitry 12 generates "final packet status" (MAC packet status). The status information (also called "protocol analyzer status") and the MAC packet status information is then transferred to a free one of the DRAM buffers obtained from the free-buffer queue 24. The status information and MAC packet status information is stored prepended to the associated data in the buffer.

After all packet data has been transferred to the free DRAM buffer, receive processor 20 pushes a "receive packet descriptor" (also called a "summary") onto a "receive packet descriptor" queue 25. The "receive packet descriptor" includes a 14-bit hash value, the buffer descriptor, a buffer load-count, the MAC ID, and a status bit (also called an "attention bit"). The 14-bit hash value was previously generated by the receive processor 20 (from the TCP and IP source and destination addresses) as the packet was received. If the "attention bit" of the receive packet descriptor is a one, then the packet is not a "fast-path candidate"; whereas if the attention bit is a zero, then the packet is a "fast-path candidate". In the present example of a TCP/IP offload engine, the attention bit being a zero indicates that the packet employs both the TCP protocol and the IP protocol.

Once the "receive packet descriptor" (including the buffer descriptor that points to the DRAM buffer where the data is stored) has been placed in the "receive packet descriptor" queue 25 and the packet data has been placed in the associated DRAM buffer, one of the processors 13 and 14 can retrieve the "receive packet descriptor" from the "receive packet descriptor" queue 25 and examine the "attention bit".

If the attention bit is a digital one, then the processor determines that the packet is not a "fast-path candidate" and the packet is handled in "slow-path". In one embodiment where the packet is a TCP/IP packet, wherein the attention bit indicates the packet is not a "fast-path candidate", and where NID 3 performs full offload TCP/IP functions, general purpose processor 23 performs further protocol processing on the packet (headers and data). In another embodiment where there is no general purpose processor 23 and where NID 3 performs partial TCP/IP functions, the entire packet (headers and data) are transferred from the DRAM buffer and across host bus 6 such that CPU 4 performs further protocol processing on the packet.

If, on the other hand, the attention bit is a zero, then the processor determines that the packet is a "fast-path candidate". If the processor determines that the packet is a "fast-path candidate", then the processor uses the buffer descriptor from the "receive packet descriptor" to initiate a DMA transfer the first approximately 96 bytes of information from the pointed to buffer in DRAM 10 into a portion of SRAM 18 so that the processor can examine it. This first approximately 96 bytes contains the IP source address of the IP header, the IP destination address of the IP header, the TCP source address ("TCP source port") of the TCP header, and the TCP destination address ("TCP destination port") of the TCP header. The IP source address of the IP header, the IP destination address of the IP header, the TCP source address of the TCP header, and the TCP destination address of the TCP header together uniquely define a single "connection context" with which the packet is associated.

While this DMA transfer from DRAM to SRAM is occurring, the processor uses the 14-bit hash from the "receive packet descriptor" to identify the connection context of the packet and to determine whether the connection context is one of a plurality of connection contexts that are under the control of NID 3. The hash points to one hash bucket in a hash table 104 in SRAM 18. In the diagram of FIG. 1, each row of the hash table 104 is a hash bucket. Each hash bucket contains one or more hash table entries. If the hash identifies a hash bucket having more than one hash table entry (as set forth below in further detail), then the processor attempts to match the IP source address, IP destination address, TCP source address (port), and TCP destination address (port) retrieved from DRAM with the same fields, i.e., the IP source address, IP destination address, TCP source port, and TCP destination port of each hash table entry. The hash table entries in the hash bucket are searched one by one in this manner until the processor finds a match. When the processor finds a matching hash table entry, a number stored in the hash table entry (called a "transmit control block number", a "transaction control number", or a "TCB number") identifies a block of information (called a TCB) related to the connection context of the packet. There is one TCB maintained on NID 3 for each connection context under the control of NID 3. (The terms "CCB" and "Communication Control Block" are sometimes used instead of the terms "TCB" and "Transmit Control Block" or "Transaction Control Block".)

If the connection context is determined not to be one of the contexts under the control of NID 3, then the "fast-path candidate" packet is determined not to be an actual "fast-path packet." In one embodiment where NID 3 includes general purpose processor 23 and where NID 3 performs full TCP/IP offload functions, processor 23 performs further TCP/IP protocol processing on the packet. In another embodiment where NID 3 performs partial TCP/IP offload functions, the entire packet (headers and data) is transferred across host bus 6 for further TCP/IP protocol processing by the sequential protocol processing stack of CPU 4.

If, on the other hand, the connection context is one of the connection contexts under control of NID 3, then software executed by the processor (13 or 14) checks for one of numerous exception conditions and determines whether the packet is a "fast-path packet" or is not a "fast-path packet". These exception conditions include: 1) IP fragmentation is detected; 2) an IP option is detected; 3) an unexpected TCP flag (urgent bit set, reset bit set, SYN bit set or FIN bit set) is detected; 4) the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence).

If the software executed by the processor (13 or 14) detects an exception condition, then the processor determines that the "fast-path candidate" is not a "fast-path packet." In such a case, the connection context for the packet is "flushed" (control of the connection context is passed back to the stack) so that the connection context is no longer present in the list of connection contexts under control of NID 3. If NID 3 is a full TCP/IP offload device including general purpose processor 23, then general purpose processor 23 performs further TCP/IP processing on the packet. In other embodiments where NID 3 performs partial TCP/IP offload functions and NID 3 includes no general purpose processor 23, the entire packet (headers and data) is transferred across host bus 6 to CPU 4 for further "slow-path" protocol processing.

If, on the other hand, the processor (13 or 14) finds no such exception condition, then the "fast-path candidate" packet is determined to be an actual "fast-path packet". The processor executes a software state machine such that the packet is processed in accordance with the IP and TCP protocols. The data portion of the packet is then DMA transferred to a destination identified by another device or processor. In the present example, the destination is located in storage 5 and the destination is identified by a file system controlled by CPU 4. CPU 4 does no or very little analysis of the TCP and IP headers on this "fast-path packet". All or substantially all analysis of the TCP and IP headers of the "fast-path packet" is done on NID 3.

Description of a TCB Lookup Method:

As set forth above, information for each connection context under the control of NID 3 is stored in a block called a "Transmit Control Block" (TCB). An incoming packet is analyzed to determine whether it is associated with a connection context that is under the control of NID 3. If the packet is associated with a connection context under the control of NID 3, then a TCB lookup method is employed to find the TCB for the connection context. This lookup method is described in further detail in connection with FIGS. 2 and 3.

NID 3 is a multi-receive processor network interface device. In NID 3, up to sixteen different incoming packets can be in process at the same time by two processors 13 and 14. (Processor 15 is a utility processor, but each of processors 13 and 14 can perform receive processing or transmit processing.) A processor executes a software state machine to process the packet. As the packet is processed, the state machine transitions from state to state. One of the processors, for example processor 13, can work on one of the packets being received until it reaches a stopping point. Processor 13 then stops work and stores the state of the software state machine. This stored state is called a "processor context". Then, at some later time, either the same processor 13 or the other processor 14 may resume processing on the packet. In the case where the other processor 14 resumes processing, processor 14 retrieves the prior state of the state machine from the previous "processor context", loads this state information into its software state machine, and then continues processing the packet through the state machine from that point. In this way, up to sixteen different flows can be processed by the two processors 13 and 14 working in concert.

In this example, the TCB lookup method starts after the TCP packet has been received, after the 14-bit hash and the attention bit has been generated, and after the hash and attention bit have been pushed in the form of a "receive packet descriptor" onto the "receive packet descriptor queue".

In a first step (step 200), one of processors 13 or 14 obtains an available "processor context". The processor pops (step 201) the "receive packet descriptor" queue 25 to obtain the "receive packet descriptor". The "receive packet descriptor" contains the previously-described 14-bit hash value 101 (see FIG. 2) and the previously-described attention bit. The processor checks the attention bit.

If the attention bit is set (step 202), then processing proceeds to slow-path processing. As set forth above, if NID 3 is a TCP/IP full-offload device and if the packet is a TCP/IP packet, then further TCP/IP processing is performed by general purpose processor 23. As set forth above, if NID 3 is a TCP/IP partial offload device, then the packet is sent across host bus 6 for further protocol processing by CPU 4.

If, on the other hand, the attention bit is not set (step 203), then the processor initiates a DMA transfer of the beginning part of the packet (including the header) from the identified buffer in DRAM 10 to SRAM 18. 14-bit hash value 101 (see FIG. 2) actually comprises a 12-bit hash value 102 and another two bits 103. The 12-bit hash value (bits[13:2]) identifies an associated one of 4096 possible 64-byte hash buckets. In this embodiment, up to 48 of these hash buckets can be cached in SRAM in a hash table 104, whereas any additional used hash buckets 105 are stored in DRAM 10. Accordingly, if the hash bucket identified by the 12-bit hash value is in DRAM 10, then the hash bucket is copied (or moved) from DRAM 10 to an available row in hash table 104. To facilitate this, there is a hash byte (SRAM_hashbt) provided in SRAM for each of the possible 4096 hash buckets. A six-bit pointer field in the hash byte indicates whether the associated hash bucket is located in SRAM or not. If the pointer field contains a number between 1 and 48, then the pointer indicates the row of hash table 104 where the hash bucket is found. If the pointer field contains the number zero, then the hash bucket is not in hash table 104 but rather is in DRAM. The processor uses the 12-bit hash value 102 to check the associated hash byte to see if the pointed to hash bucket is in the SRAM hash table 104 (step 204).

If the hash bucket is in the SRAM hash table 104 (step 205), then processing is suspended until the DMA transfer of the header from DRAM to SRAM is complete.

If, on the other hand, the hash bucket is not in the SRAM hash table 104 (step 206), then a queue (Q_FREEHASH-SLOTS) identifying free rows in hash table 104 is accessed (the queue is maintained by queue manager 19) and a free hash bucket row (sometimes called a "slot") is obtained. The processor then causes the hash bucket to be copied or moved from DRAM and into the free hash bucket row. Once the hash bucket is present in SRAM hash table 104, the processor updates the pointer field in the associated hash byte to indicate that the hash bucket is now in SRAM and is located at the row now containing the hash bucket.

Once the pointed to hash bucket is in SRAM hash table 104, the up to four possible hash bucket entries in the hash bucket are searched one by one (step 207) to identify if the TCP and IP fields of an entry match the TCP and IP fields of the packet header 106 (the TCP and IP fields from the packet header were obtained from the receive descriptor).

Figure 2:
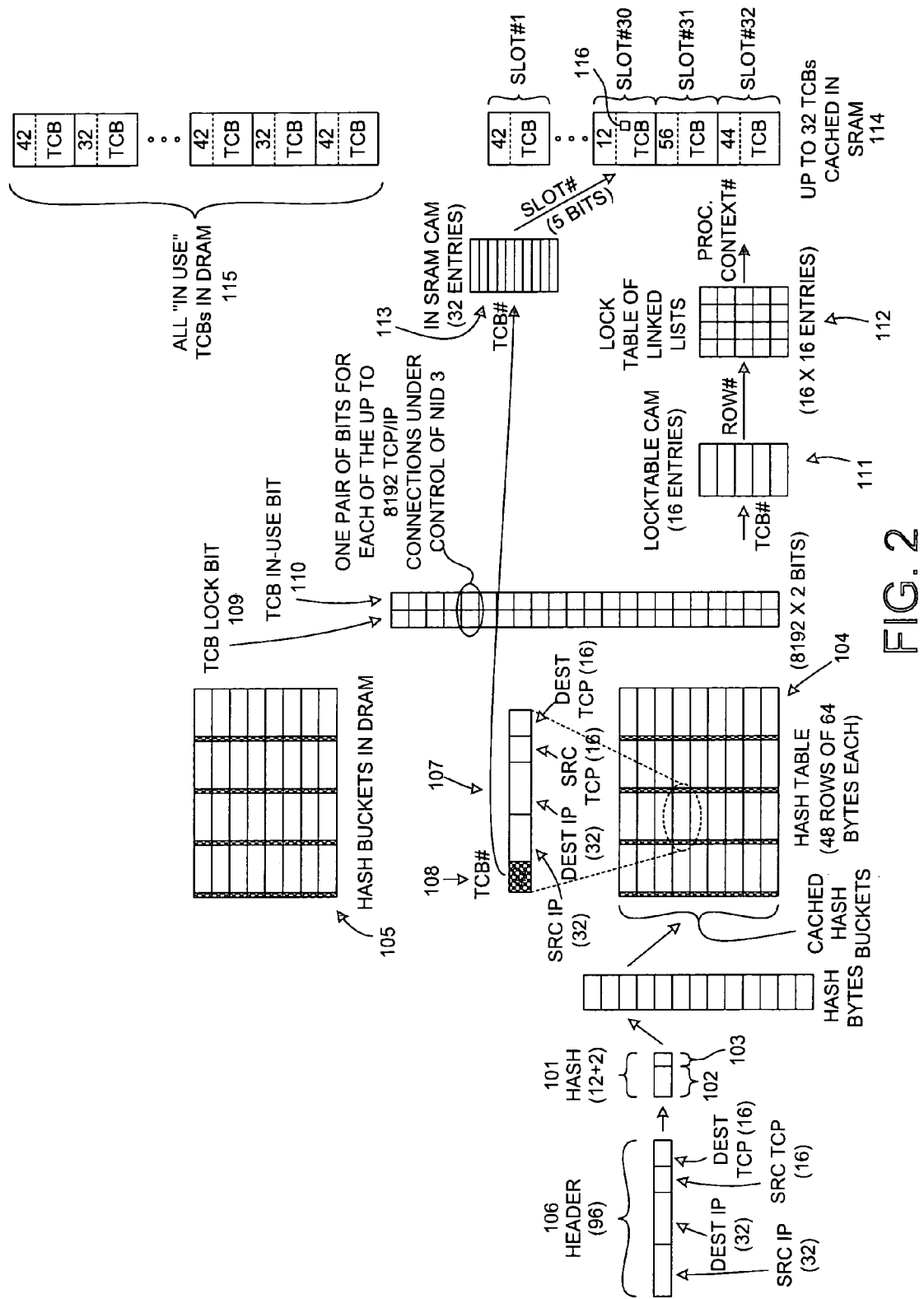
FIG. 2 is a simplified diagram of various structures and steps involved in the processing of an incoming packet in accordance with an embodiment of the present invention.
Figure 3A:
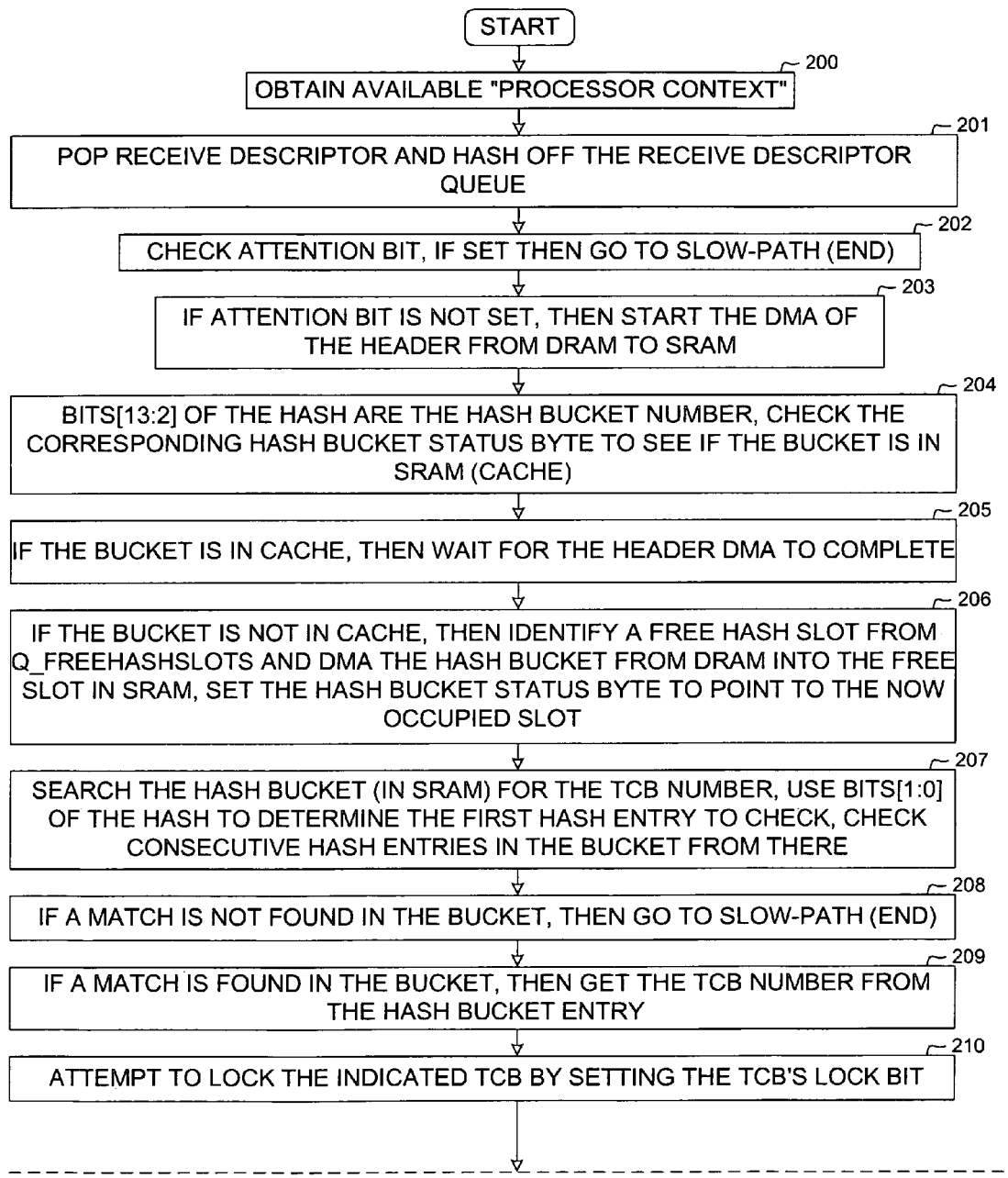
FIG. 3 is a flowchart of a method in accordance with an embodiment of the present invention.
Figure 3B:
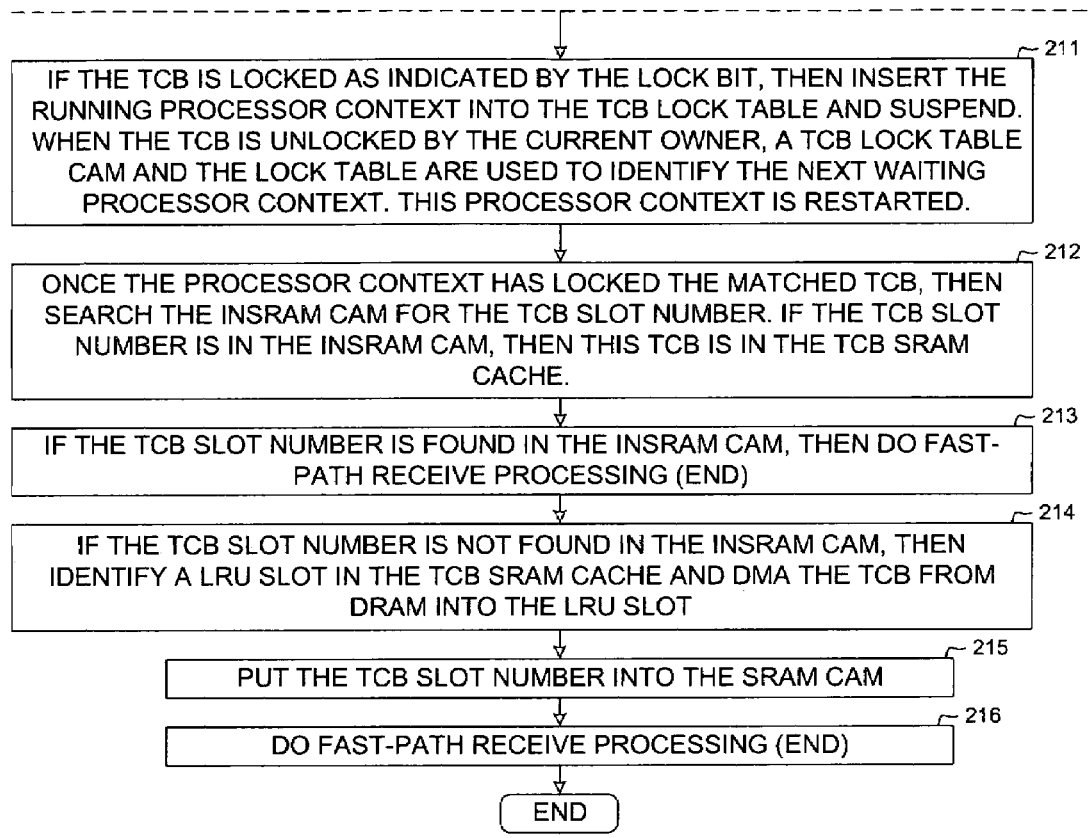
Figure 3:
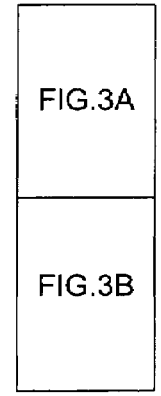

In the example of FIG. 2, the pointed to hash bucket contains two hash entries. The hash entries are checked one by one. The two bits 103 Bits[1:0] of the 14-bit hash are used to determine which of the four possible hash table entry rows (i.e., slots) to check first. In FIG. 2, the second hash entry 107 (shown in exploded view) is representative of the other hash table entries. It includes a 16-bit TCB# 108, a 32-bit IP destination address, a 32-bit IP source address, a 16-bit TCP destination port, and a 16-bit TCP source port.

If all of the entries in the hash bucket are searched and a match is not found (step 208), then processing proceeds by the slow-path. If, on the other hand, a match is found (step 209), then the TCB# portion 108 of the matching entry identifies the TCB of the connection context.

NID 3 supports both fast-path receive processing as well as fast-path transmit processing. A TCP/IP connection can involve bidirectional communications in that packets might be transmitted out of NID 3 on the same TCP/IP connection that other packets flow into NID 3. A mechanism is provided so that the context for a connection can be "locked" by one processor (for example, a processor receiving a packet on the TCP/IP connection) so that the another processor (for example, a processor transmitting a packet on the same TCP/IP connection) will not interfere with the connection context. This mechanism includes two bits for each of the up to 8192 connections that can be controlled by NID 3: 1) a "TCB lock bit" (SRAM_tcblock), and 2) a "TCB in-use bit" (SRAM_tcbinuse). The "TCB lock bits" 109 and the "TCB in-use bits" 110 are maintained in SRAM 18.

The processor attempts to lock the designated TCB (step 210) by attempting to set the TCB's lock bit. If the lock bit indicates that the TCB is already locked, then the processor context number (a 4-bit number) is pushed onto a linked list of waiting processor contexts for that TCB. Because there are sixteen possible processor contexts, a lock table 112 is maintained in SRAM 18. There is one row in lock table 112 for each of the sixteen possible processor contexts. Each row has sixteen four-bit fields. Each field can contain the 4-bit processor context number for a waiting processor context. Each row of the lock table 112 is sixteen entries wide because all sixteen processor contexts may be working on or waiting for the same TCB.

If the lock bit indicates that the TCB is already locked (step 211), then the processor context number (a four-bit number because there can be up to sixteen processor contexts) is pushed onto the row of the lock table 112 associated with the TCB. A lock table content addressable memory (CAM) 111 is used to translate the TCB number (from TCB field 108) into the row number in lock table 112 where the linked list for that TCB number is found. Accordingly, lock table CAM 111 receives a sixteen-bit TCB number and outputs a four-bit row number. When the processor context that has the TCB locked is ready to suspend itself, it consults the lock table CAM 111 and the associated lock table 112 to determine if there is another processor context waiting for the TCB. If there is another processor context waiting (there is an entry in the associated row of lock table 112), then it restarts the first (oldest) of the waiting processor contexts in the linked list. The restarted processor context is then free to lock the TCB and continue processing.

If, on the other hand, the TCB is not already locked, then the processor context locks the TCB by setting the associated TCB lock bit 109. The processor context then supplies the TCB number (sixteen bits) to an IN SRAM CAM 113 (step 212) to determine if the TCB is in one of thirty-two TCB slots 114 in SRAM 18. (Up to thirty-two TCBs are cached in SRAM, whereas a copy of all "in-use" TCBs is kept in DRAM). The IN SRAM CAM 113 outputs a sixteen-bit value, five bits of which point to one of the thirty-two possible TCB slots 114 in SRAM 18. One of the bits is a "found" bit.

If the "found" bit indicates that the TCB is "found", then the five bits are a number from one to thirty-two that points to a TCB slot in SRAM 18 where the TCB is cached. The TCB has therefore been identified in SRAM 18, and fast-path receive processing continues (step 213).

If, on the other hand, the "found" bit indicates that the TCB is not found, then the TCB is not cached in SRAM 18. All TCBs 115 under control of NID 3 are, however, maintained in DRAM 10. The information in the appropriate TCB slot in DRAM 10 is then written over one of the thirty-two TCB slots 114 in SRAM 18. In the event that one of the SRAM TCB slots is empty, then the TCB information from DRAM 10 is DMA transferred into that free SRAM slot. If there is no free SRAM TCB slot, then the least-recently-used TCB slot in SRAM 18 is overwritten.

Once the TCB is located in SRAM cache 1114, the IN SRAM CAM 113 is updated to indicate that the TCB is now located in SRAM at a particular slot. The slot number is therefore written into the IN SRAM CAM 113. Fast-path receive processing then continues (step 216).

When a processor context releases control of a TCB, it is not always necessary for the TCB information in SRAM 18 to be written to DRAM to update the version of the TCB in DRAM. If, for example, the TCB is a commonly used TCB and the TCB will be used again in the near future by the next processor context, then the next processor context can use the updated TCB in SRAM without the updated TCB having to have been written to DRAM and then having to be transferred back from DRAM to SRAM. Avoiding this unnecessary transferring of the TCB is advantageous. In accordance with one embodiment of the present invention, the processor context releasing control of a TCB does not update the DRAM version of the TCB, but rather the processor context assuming control of the TCB has that potential responsibility. A "dirty bit" 116 is provided in each TCB. If the releasing processor context changed the contents of the TCB (i.e., the TCB is dirty), then the releasing processor context sets this "dirty bit" 116. If the next processor context needs to put another TCB into the SRAM TCB slot held by the dirty TCB, then the next processor first writes the dirty TCB information (i.e., updated TCB information) to overwrite the corresponding TCB information in DRAM (i.e., to update the DRAM version of the TCB). If, on the other hand, the next processor does not need to move a TCB into an SRAM slot held by a dirty TCB, then the next processor does not need to write the dirty TCB information to DRAM. If need be, the next processor can either just update a TCB whose dirty bit is not set, or the next processor can simply overwrite the TCB whose dirty bit is not set (for example, to move another TCB into the slot occupied by the TCB whose dirty bit is not set).

In one specific embodiment, the instruction set of processors 13-15 includes the instructions in Table 1 below.

TABLE 1

| OpdSel | Name | Description |
| --- | --- | --- |
| 0b011000000 | CamAddrA | Write Only. CamAddr=AluOut[4:0]. This register is written to define which one of the entries of the multi-entry CAM A will be read from or written to. The entry is either read from CamContentsA register on a read, or the entry is written into the CamContentsA register on a write. CAM A is a thirty-two entry CAM when CAMs A and B are used together as a single CAM. If CAM |

TABLE 1-continued

| OpdSel | Name | Description |
|---|---|---|
| | | A is used separately, then CAM A is an sixteen-entry CAM. |
| 0b011000001 | CamContentsA | Read/Write. When writing: Cam Valid[CamAddrA]=~AluOut[16]. CamContents[CamAddrA]=AluOut[15:0]. Accordingly, writing bit sixteen "invalidates" the CAM entry. The tilde symbol here indicates the logical NOT. When reading: Bit 16=~CamValid[CamAddrA]. Bits 15–0=Cam Contents[CamAddrA]. |
| 0b011000010 | CamMatchA | Read/Write. Writing a sixteen-bit value into this register causes CAM A to search its entries for a match with valid CAM A entries. A subsequent read of this register returns the result of the search as follows: Bit 5=contents not found. Bits 4–0=If the contents were found and the matched entry is valid, then bits 4–0 are the number of the CAM entry which matched. |
| 0b011000011 | CamConfigAB | Write Only. CamSplit=AluOut[0]. If CamSplit is set, then CAM A is split into two sixteen-entry CAMs: CAM A and CAM B. The following addresses (CamAddrB, CanConentsB and CamMatchB) are then available to use the second part of the CAM (CAM B). |
| 0b011000100 | CamAddrB | Write Only. See the description of CamAddrA above. |
| 0b011000101 | CamContentsB | Read/Write. See the description of CamContentsB above. |
| 0b011000110 | CamMatchB | Read/Write. These registers (CamAddrB, Cam ContentsB and CamMatchB) are identical in use to those for CAM A (see above), except that they are for the second half of the first CAM (CAM B). |
| 0b011001000 | CamAddrC | Write Only. This register for CAM C is identical in function to the corresponding register for CAM A. |
| 0b011001001 | CamContentsC | Read/Write. This register for CAM C is identical in function to the corresponding register for CAM A. |
| 0b011001010 | CamMatchC | Read/Write. This register for CAM C is identical in function to the corresponding register for CAM A. |
| 0b011001011 | CamConfigCD | Write Only. As in the case of CAM A above, CAM C can be split into two sixteen-entry CAMs: CAM C and CAM D. |
| 0b011001100 | CamAddrD | Write Only. This register for CAM D is identical in function to the corresponding register for CAM D. |
| 0b011001101 | CamContentsD | Read/Write. This register for CAM D is identical in function to the corresponding register for CAM D. |
| 0b011001110 | CamMatchD | Read/Write. This register for CAM D is identical in function to the corresponding register for CAM D. |

One embodiment of the code executed by processors 13-15 is written using functions. These functions are in turn made up of instructions including those instructions set forth in Table 1 above. The functions are set forth in the file SUBR.MAL of the CD Appendix (the files on the CD Appendix are incorporated by reference into the present patent document). These functions include:

1) The INSRAM_CAM_INSERT function: Executing this function causes the TCB number present in a register (register cr11) to be written into the IN SRAM CAM (CAM A of the processor). The particular CAM slot written to is identified by the lower sixteen bits of the value present in another register (register ThuffL18).

2) The INSRAM_CAM_REMOVE function: Executing this function causes the CAM entry in the IN SRAM CAM slot identified by a register (register cr11) to be invalidated (i.e., removed). The entry is invalidated by setting bit 16 of a register (register CAM CONTENTS_A).

3) The INSRAM_CAM_SEARCH function: Executing this function causes a search of the IN SRAM CAM for the TCB number identified by the TCB number present in a register (register cr11). The result of the search is a five-bit slot number that is returned in five bits of another register (register ThuffL18). The value returned in a sixth bit of the register ThuffL18 indicates whether or not the TCB number was found in the INSRAM_CAM.

4) The LOCKBL_CAM_INSERT function: Executing this function causes the sixteen-bit TCB number present in a register (register cr11) to be written into the LOCK TABLE CAM (CAM C of the processor). The particular CAM slot written to is identified by the value present in a register (register cr10).

5) The LOCKBL_CAM_REMOVE function: Executing this function causes the CAM entry in the LOCK TABLE CAM slot identified by a register (register cr10) to be invalidated (i.e., removed). The entry is invalidated by setting bit of another register (register CAM_CONTENTS_C).

6) The LOCK_TABLE_SEARCH function: Executing this function causes a search of the LOCK TABLE CAM for the TCB number identified by the TCB number present in a register (register cr11). The result of the search is a four-bit number of a row in the lock table. The four-bit number is four bits of another register (register cr10). The value returned in a fifth bit of the register cr10 indicates whether or not the TCB number was found in the LOCK TABLE CAM.

Compact Disc Appendix:

The Compact Disc Appendix includes a folder "CD Appendix A", a folder "CD Appendix B", a folder "CD Appendix C", and a file "title page.txt". CD Appendix A includes a description of an integrated circuit (the same as ASIC 9 of FIG. 1 except that the integrated circuit of CD Appendix A does not include processor 23) of one embodiment of a TCP/IP offload network interface device (NID). CD Appendix B includes software that executes on a host computer CPU, where the host computer is coupled to a NID incorporating the integrated circuit set forth in CD Appendix A and wherein the host computer includes a CPU that executes a protocol stack. CD Appendix C includes a listing of the program executed by the receive processor of the integrated circuit set forth in Appendix A as well as a description of the instruction set executed by the receive processor.

The CD Appendix A includes the following: 1) a folder "Mojave verilog code" that contains a hardware description of an embodiment of the integrated circuit, and 2) a folder "Mojave microcode" that contains code that executes on the processors (for example, processors 13 and 14 of FIG. 1) of the integrated circuit. In the folder "Mojave microcode", the file "MAINLOOP.MAL" is commented to indicate instructions corresponding to various steps of the method of FIG. 3. In the folder "Mojave microcode", the file "SEQ.H" is a definition file for the "MAINLOOP.MAL" code. Page 9 sets forth steps in accordance with a twenty-step method in accordance with some embodiments of the present invention. Page 10 sets forth the structure of a TCB in accordance with some embodiments. Page 17 sets forth the structure of a hash byte (called a "TCB Hash Bucket Status Byte").

A description of the instruction set executed by processors 13-15 of FIG. 1 is set forth in U.S. patent application Ser. No. 10/420,364, entitled TCP/IP Offload Device, filed Apr. 22, 2003.

The CD Appendix B includes the following: 1) a folder entitled "simba (device driver software for Mojave)" that contains device driver software executable on the host computer; 2) a folder entitled "atcp (free BSD stack and code added to it)" that contains a TCP/IP stack [the folder "atcp" contains: a) a TCP/IP stack derived from the "free BSD" TCP/IP stack (available from the University of California, Berkeley) so as to make it run on a Windows operating system, and b) code added to the free BSD stack between the session layer above and the device driver below that enables the BSD stack to carry out "fast-path" processing in conjunction with the NID]; and 3) a folder entitled "include (set of files shared by ATCP and device driver)" that contains a set of files that are used by the ATCP stack and are used by the device driver.

The CD Appendix C includes the following: 1) a file called "mojave_rcv_seq (instruction set description).mdl" that contains a description of the instruction set of the receive processor, and 2) a file called "mojave_rcv_seq (program executed by receive processor).mal" that contains a program executed by the receive processor.

System Configurations:

FIGS. 4-9 illustrate various system configurations involving a network interface device in accordance with the present invention. These configurations are but some system configurations. The present invention is not limited to these configurations, but rather these configurations are illustrated here only as examples of some of the many configurations that are taught in this patent document.

Figure 4:
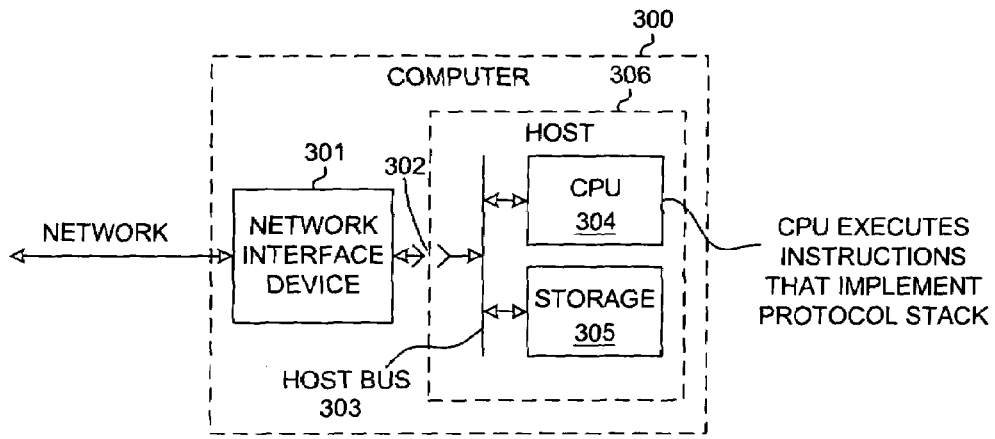
FIGS. 4, 5, 6, 7, 8 and 9 are diagrams that illustrate various system configurations involving a network interface device in accordance with the present invention.

FIG. 4 shows a computer 300 wherein a network interface device (NID) 301 is coupled via a connector 302 and a host bus 303 to a CPU 304 and storage 305. CPU 304 and storage 305 are together referred to as a "host" 306.

Figure 5:
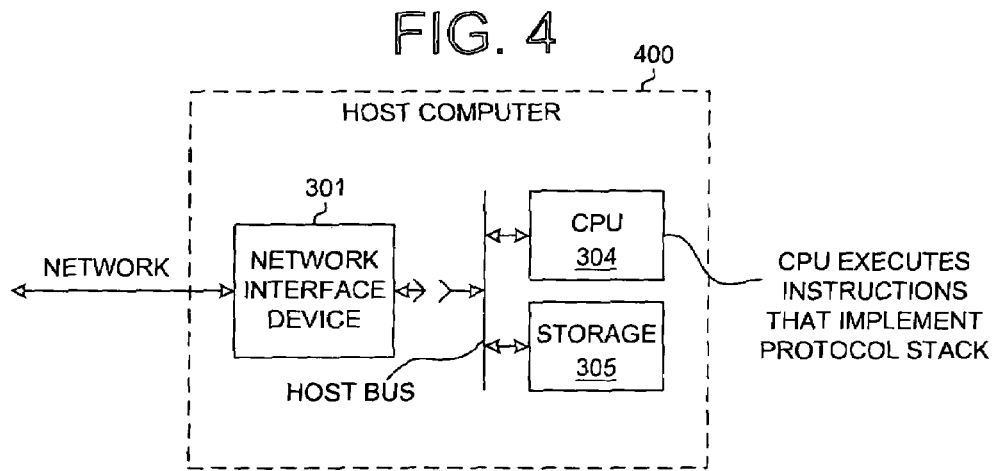

Rather than being considered coupled to a host, network interface device (NID) 301 can be considered part of a host as shown in FIG. 5. In FIG. 5, what is called a host computer 400 includes NID 301 as well as CPU 304 and storage 305. In both the examples of FIGS. 4 and 5, the CPU executes instructions that implement a sequential protocol processing stack. The network interface device 301 performs fast-path hardware accelerated protocol processing on some types of packets such that CPU 304 performs no or substantially no protocol processing on these types of packets. Control of a connection can be passed from the NID to the stack and from the stack to the NID.

Figure 6:
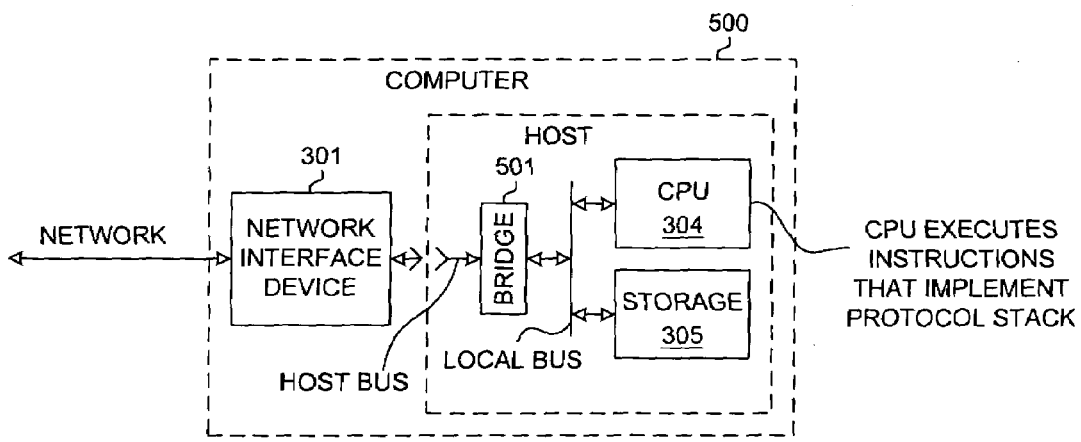

FIG. 6 shows a computer 500 wherein NID 301 is coupled to CPU 304 and storage 305 by a bridge 501.

Figure 7:
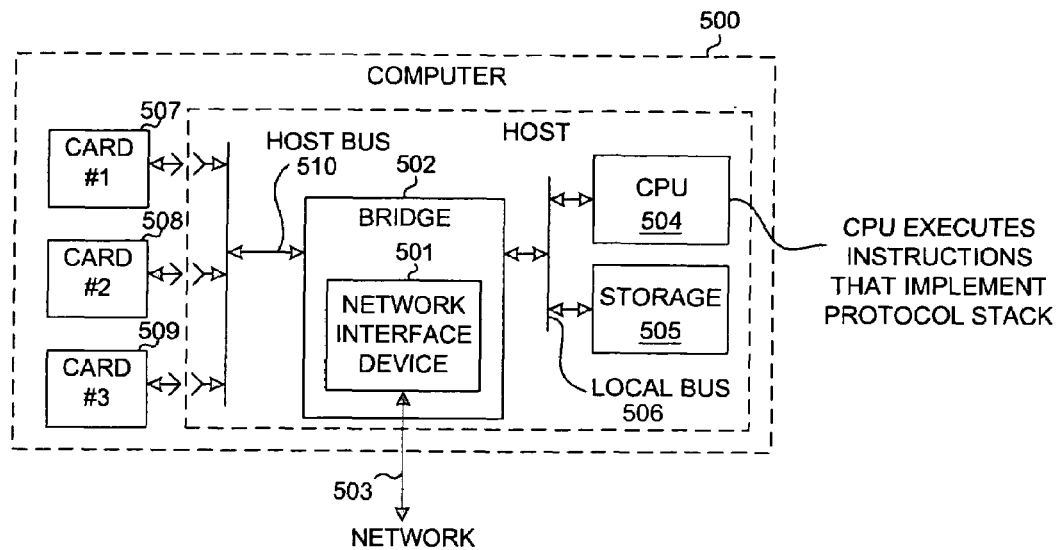

FIG. 7 shows a computer 500 wherein a network interface device (NID) 501 is integrated into a bridge integrated circuit 502. Bridge 502 couples computer 500 to a network 503. Bridge 502 is coupled to CPU 504 and storage 505 by local bus 506. CPU 504 executes instructions that implement a software sequential protocol processing stack. Bridge 502 is coupled to multiple expansion cards 507, 508 and 509 via a host bus 510. Network interface device 501 performs TCP and IP protocol processing on certain types of packets, thereby offloading CPU and its sequential protocol processing stack of these tasks. Control of a connection can be passed from the NID to the stack and from the stack to the NID.

In one version, NID 501 is a full TCP/IP offload device. In another version, NID is a partial TCP/IP offload device. The terms "partial TCP/IP" are used here to indicate that all or substantially all TCP and IP protocol processing on certain types of packets is performed by the offload device, whereas substantial TCP and IP protocol processing for other types of packets is performed by the stack.

Figure 8:
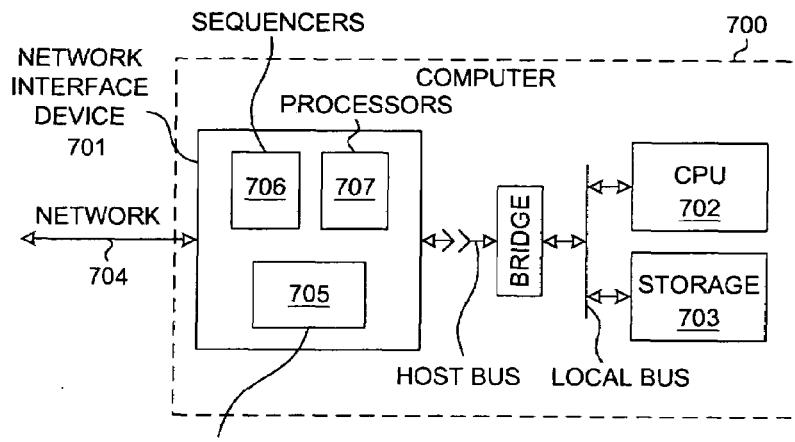

FIG. 8 shows a computer 700 wherein a network interface device (NID) 701 couples CPU 702 and storage 703 to network 704. NID 701 includes a processor that implements a sequential protocol processing stack 705, a plurality of sequencers 706 (such as, for example, a receive sequencer and a transmit sequencer), and a plurality of processors 707. This embodiment maybe a full-offload embodiment in that processor 705 fully offloads CPU 702 and its stack of all or substantially all TCP and IP protocol processing duties.

Figure 9:
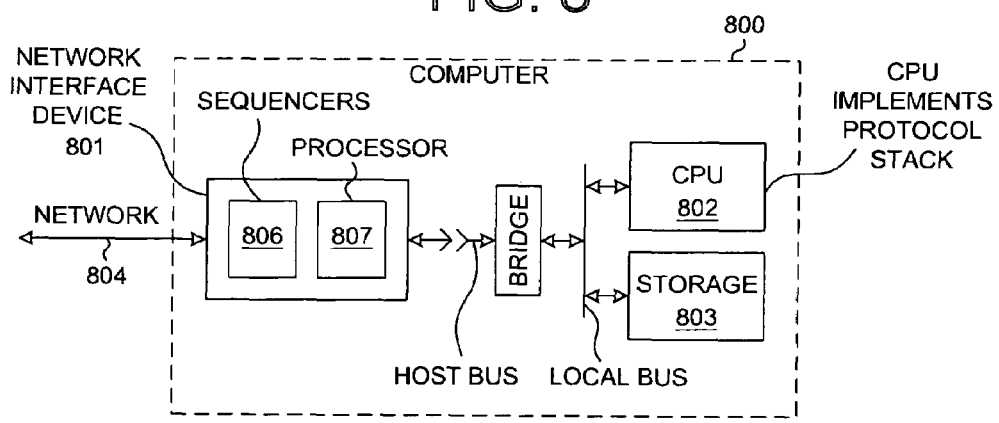

FIG. 9 shows a computer 800 wherein a network interface device (NID) 801 couples CPU 802 and storage 803 to network 804. NID 801 includes a plurality of sequencers 806 (for example, a receive sequencer and a transmit sequencer), and a plurality of processors 807. In this example, CPU 802 implements a software sequential protocol processing stack, and NID 801 does not include a general purpose processor that implements a sequential software protocol processing stack. This embodiment may be a partial-offload embodiment in that NID 801 performs all or substantially all TCP and IP protocol processing tasks on some types of packets, whereas CPU 802 and its stack perform TCP and IP protocol processing on other types of packets.

In the realization of different embodiments, the techniques, methods, and structures set forth in the documents listed below are applied to the system, and/or to the network interface device (NID), and/or to the application specific integrated circuit (ASIC) set forth in present patent document: U.S. Pat. No. 6,389,479; U.S. Pat. No. 6,470,415; U.S. Pat. No. 6,434,620; U.S. Pat. No. 6,247,060; U.S. Pat. No. 6,226,680; Published U.S. Patent Application 20020095519; Published U.S. Patent Application No. 20020091844; Published U.S. Patent Application No. 20010021949; Published U.S. Patent Application No. 20010047433; and U.S. patent application Ser. No. 09/801,488, entitled "Port Aggregation For Network Connections That Are Offloaded To Network Interface Devices", filed Mar. 7, 2001. The content of each of the above-identified patents, published patent applications, and patent application is incorporated herein by reference.

Although certain specific exemplary embodiments are described above in order to illustrate the invention, the invention is not limited to the specific embodiments. NID 3 can be part of a memory controller integrated circuit or an input/output (I/O) integrated circuit or a bridge integrated circuit of a microprocessor chip-set. In some embodiments, NID 3 is part of an I/O integrated circuit chip such as, for example, the Intel 82801 integrated circuit of the Intel 820 chip set. NID 3 may be integrated into the Broadcom ServerWorks Grand Champion HE chipset, the Intel 82815 Graphics and Memory Controller Hub, the Intel 440BX chipset, or the Apollo VT8501 MVP4 North Bridge chip. The instructions executed by receive processor 20 and/or processors 13-15 are, in some embodiments, downloaded upon power-up of NID 3 into a memory on NID 3, thereby facilitating the periodic updating of NID functionality. High and low priority transmit queues may be implemented using queue manager 19. Hardcoded transmit sequencer 21, in some embodiments, is replaced with a transmit processor that executes instructions. Processors 13, 14 and 15 can be identical processors, each of which can perform receive processing and/or transmit processing and/or utility functions.

Figure 10:
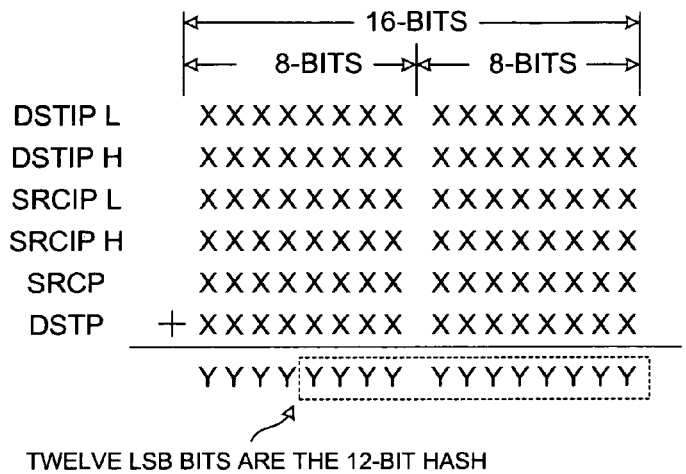
FIG. 10 is a diagram that illustrates one way that a hash value can be generated in accordance with an embodiment of the present invention.

Hash Function:

There are many suitable ways that receive processor 20 of FIG. 1 can generate a hash from the socket address of an incoming packet. The socket address (sometimes called a "4-tuple" or a "flow tuple") includes the incoming packet's: source IP address (SRCIP), destination IP address (DSTIP), source TCP port (SRCP), and destination TCP port (DSTP). FIG. 10 is a diagram that illustrates of one of the suitable ways. As illustrated in FIG. 10, the 32-bit destination IP address is made up of a 16-bit low portion (DSTIPL) and a 16-bit high portion (DSTIPH). Similarly, the 32-bit source IP address is made up of a 16-bit low portion (SRCIPL) and a 16-bit high portion (SRCIPH). The source TCP port address and the destination TCP port address are both 16-bit values. These six 16-bit values are added together as shown in FIG. 10. The least significant twelve bits of the resulting sum are illustrated in FIG. 10 surrounded by a dashed box. These twelve bits are, in one embodiment, the 12-bit hash value 102 shown in FIG. 2. As described above in connection with FIG. 2, hash value 102 is used on network interface device (NID) 3 of FIG. 1 to identify the connection context of the packet, and if the connection context is in the list of connection contexts under the control of the NID, to locate the TCB on the NID associated with the connection.

Figure 11:
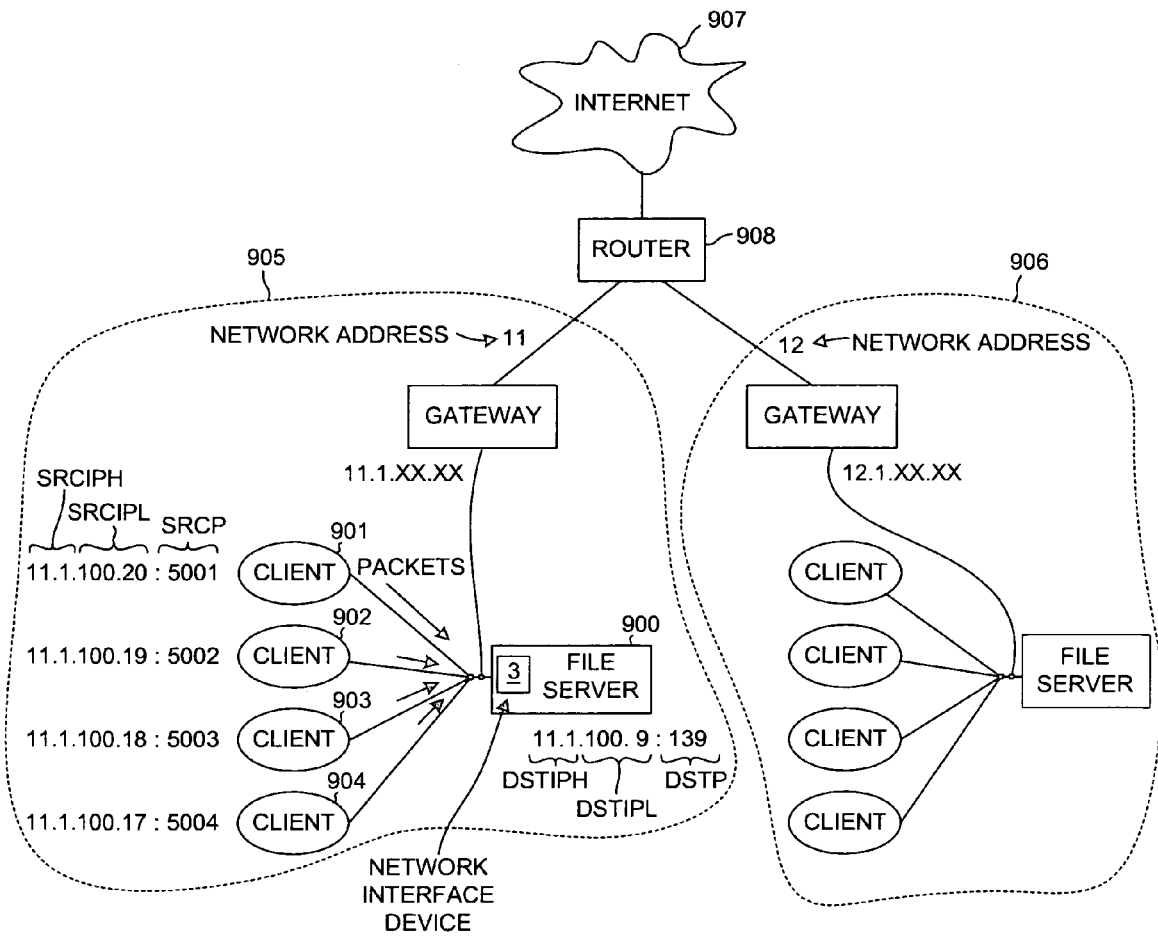
FIG. 11 is a simplified diagram of a file server application of a network interface device (NID) in accordance with an embodiment of the present invention.

FIG. 11 is a diagram of one use of network interface device (NID) 3 of FIG. 1. NID 3 is part of a file server 900. File server 900 in FIG. 11 corresponds to system 1 in FIG. 1.

In the network structure of FIG. 11, multiple client devices 901-904 are coupled to the file server 900 within a network 905. The client devices may, for example, be workstations. Network 905 may be a corporate network. File server 900 is a server that primarily distributes and supplies files to local clients on network 905 as opposed to a web server that primarily holds World Wide Web documents and makes them available for viewing by browsers executing on remote computers located outside network 905 in disparate parts of the internet. In the example of FIG. 11, network 905 and a second network 906 are, however, coupled to the internet 907 via an IP router 908. The IP network address of network 905 is "11" (binary "1011"), whereas the IP network address of network 906 is "12" (binary "1100"). Not only do all the devices on network 905 have the same network address, but they are also all have the same subnet address. The subnet address in the example of FIG. 11 is "1.100". Accordingly, each of the devices on network 905 has an IP address that starts with the same "11.1.100".

Consider the transfer of a packet from client 901 to file server 900. Assume for this example that the session layer protocol is SMB, the transport layer protocol is TCP, and the network layer protocol is IP. Because client 901 is the source for this communication, the SRCIP is the IP address of client 901. In the example of FIG. 11, the SRCIP is "11.1.100.20". Because file server 900 is the destination for this communication, the DSTIP is the IP address of file server 900. In the example of FIG. 11, the DSTIP is "11.1.100.9".

Figure 12:
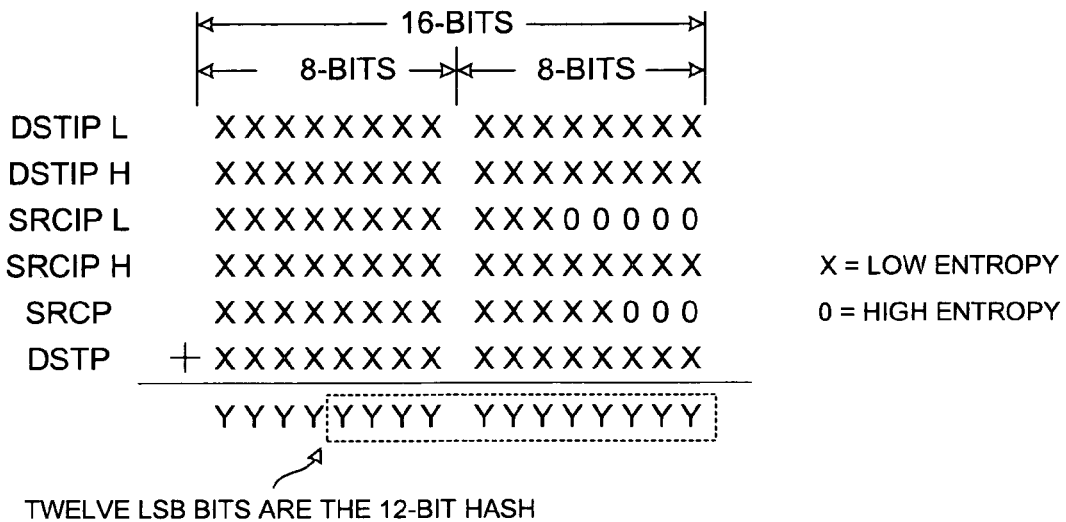
FIG. 12 is a diagram that illustrates high entropy bits and low entropy bits in the socket addresses of packets flowing into the file server of FIG. 11 from clients 901-904.

Because the destination IP address for TCP/IP packets received onto file server 900 from clients 901-904 is always the same ("11.1.100.9") regardless of which of the clients 901-904 sent the packet, using the DSTIP address of an incoming TCP/IP packet in the generation of hash 102 (see FIG. 2) does not tend to result in different hash values being generated for different incoming packets. For packets received from clients 901-904, the DSTIP address bits in the socket addresses do not change from incoming packet to incoming packet. For that reason, all the bits of the DSTIPL and DSTIPH in FIG. 12 are indicated with an "X". The "X" designates a "low entropy" bit.

Because all the clients 901-904 are on the same network, the first twenty-seven bits of their source IP addresses are all the same. These are the bits that designate the "11.1.100.2" first portion of the SRCIP addresses seen in FIG. 11. Using these bits to determine from which of the clients 901-904 a TCP/IP packet originated is not helpful, because these bits are the same for all TCP/IP packets received from clients 901-904. For that reason, the first twenty-seven bits of the source IP address are designated with the "X" for "low entropy" in FIG. 12.

Because all the communications from clients 901-904 are in this example SMB communications, the destination port on file server 900 used to receive all these packets is the SMB port (port 139). The destination TCP port is therefore the same in all TCP/IP packets received onto file server 900 from clients 901-904. For that reason, all the DSTP bits in FIG. 12 are indicated with the "X" for "low entropy".

Each of the clients 901-904 may be executing the same operating system. The operating system may, for example, be Microsoft Windows. A computer running Microsoft Windows starts up using a predetermined source TCP port base value. As connections are established to or from this computer, the source TCP port typically increments from this base value. Due to this, the source TCP ports for clients 901-904 on network 905 tend to be very similar because the clients all start off attempting to use the same source TCP port. In the example of FIG. 11, the clients 901-904 have source ports 5001, 5002, 5003 and 5004, respectively. Only the least significant bits of the SRC TCP port will typically be different. For that reason, the most significant thirteen bits of the SRCP address in FIG. 12 are indicated with the "X" for "low entropy".

There are, however, bits in the socket addresses of packets received from clients 901-904 onto file server 900 that can change from incoming packet to incoming packet. These bits are designated in FIG. 12 with "0". The "0" designates a "high entropy" socket address bit in that it is more likely than the low entropy socket address bits to change from incoming packet to incoming packet.

FIG. 12 indicates that most of the 96 bits of the socket addresses received onto file server 900 from clients 901-904 are low entropy bits. If the columns of FIG. 12 were added together in columnar fashion using the same grade school addition technique set forth in connection with FIG. 10 to form a hash, then the number of high entropy bits in the resulting sum is smaller that it could be due a phenomenon called funneling. The resulting hash value would have twelve bits, but several of the most significant bits of the hash value tend not to change from one connection to the next. The result is that the hash function is not optimally effective in spreading the likely socket addresses of incoming packets out evenly among the available hash buckets.

In the network interface device 3 of FIG. 1, for a TCP connection to be handled in fast-path by network interface device 3, the socket address of the TCP connection must be present in one of the hash buckets maintained on NID 3. Each of the hash buckets maintained on NID 3 can contain at most four socket address entries. If the socket addresses of four TCP connections are already present in a given hash bucket in the embodiment of FIG. 2, and if a subsequently received incoming packet for a fifth TCP connection is to be handled in fast-path where the hash value of the socket address of the fifth TCP connection points to that same hash bucket, then the fifth TCP connection cannot be handled in fast-path because only four socket address entries can be placed in a hash bucket. The hash function that resulted in the uneven mapping of the socket addresses of the incoming packets to the available hash buckets is therefore a problem in the file server application of FIG. 11 in that it can unduly limit the number of fast-path connections the particular NID of FIGS. 1 and 2 can handle.

In accordance with an embodiment of the present invention, a hash function is employed that results in a substantially even mapping of the socket addresses of the incoming packets to the available hash buckets maintained on the NID 3. A change in any single one of the high entropy bits (for example, see the bits designated "0" in FIG. 12) of a socket address of an incoming packet will likely result in a different hash value being generated. There are many hash functions that can perform this mapping.

Figure 13:
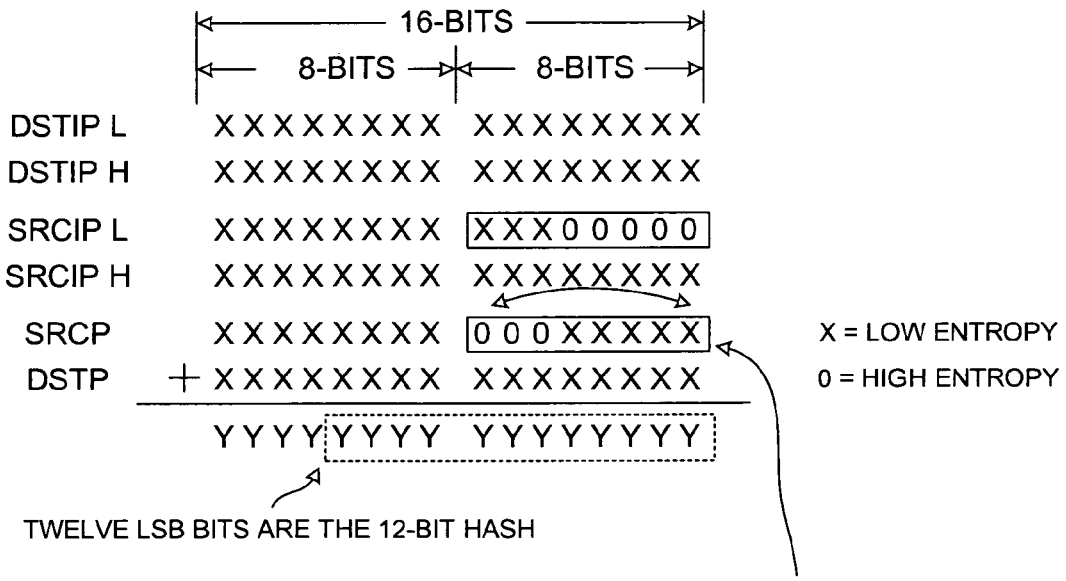
FIG. 13 is a simplified diagram illustrating how NID 3 of FIG. 11 generates a hash value in accordance with one embodiment of the present invention.

FIG. 13 is a diagram that illustrates one way that a hash value can be generated that avoids the problem set forth in FIG. 12. Rather than adding the SRCIPL and SRCP values as set forth in FIG. 12 such that the high entropy bits of the SRCP fall in the same columns as the high entropy bits of the SRCIPL, the least significant eight bits of either the SRCIPL address value or the SRCP address value are reordered in an eight bit center-mirror operation.

FIG. 13 illustrates an example where the least significant eight bits of the SRCP address value are mirrored. After the mirroring, the three high entropy bits of the SRCP address value do not fall in the same columns as the five high entropy bits of the SRCIPL address value. After the mirroring, the SRCIPL and mirrored SRCP values are combined (for example, are added together). Because the high entropy bits have been spread out over the columns, there are more high entropy bits in the resulting hash than was the case in the example of FIG. 12. In one example, only the SRCP and SRCIPL values are combined (for example, added together or word-wise exclusive ORed together), and the least twelve significant bits of the sum is the hash value. In another example, all of the six values illustrated in FIG. 13 are combined (for example, added together or word-wise exclusive ORed together), and the least twelve significant bits of the sum is the hash value. Generating a hash as set forth in FIG. 13 results in a fairly even distribution of the socket addresses of actual incoming packets among the various hash buckets of FIG. 2.

The socket address contains 96 bits. There are therefore 2E96 possible TCP connections. The stack executing on the host CPU 4 generally must be able to handle a packet communicated across any one of these connections. The NID 3, on the other hand, is fashioned to handle only a subset of the possible large number of connections in fast-path. The host computer therefore should be able to employ a large number of TCBs whereas the NID need only be able handle a smaller number of TCBs. The host stack therefore typically uses a larger number of hash buckets than does NID 3. Due to the larger number of hash buckets, the host generally employs a hash function that results in hash values having a larger number of bits than the hash function used by NID 3. The hash function used on the NID is therefore likely different than the hash function used by the host stack to identify TCBs on the host.

The different hash function used by the host stack is used to load a hash table on the host computer. To place a socket address into a given hash bucket on the host, the host stack uses its hash function to generate a hash value from the socket address. The host stack then identifies the hash bucket pointed to by the hash value and places the socket address, along with a handle, into the hash bucket. The handle identifies the TCB (maintained on the host computer) associated with the TCP connection of the incoming packet. The TCB contains TCP state information related to the TCP connection identified by the socket address.

Consider the situation where an incoming TCP/IP packet is received onto the host and where the TCP/IP packet is to be TCP processed in slow-path by the host. Assume that the socket address for the TCP connection is already present in the hash table on the host. The host receives the TCP/IP packet from the NID 3 and generates a hash value from the socket address using the particular hash function employed to load the hash table on the host. The calculation of this hash value is done by the host CPU 4 in software. The resulting hash value points to one of the hash buckets. The host stack then compares the socket address of the incoming packet with the socket address found in the pointed to hash bucket. If there is a match, then the TCB handle stored in the hash bucket along with the socket address is used to identify the TCB for the TCP connection identified by the socket address of the incoming packet. If the socket address does not match, then the next socket address stored in the hash bucket is compared to the socket address of the incoming packet. This process continues until a match is found, or until all socket entries in the hash bucket have been exhausted. To provide for a very large number of socket addresses to be stored in a hash bucket, the hash bucket typically contains a linked list of socket addresses. In this way the host can control a relatively large number of TCP connections in slow-path, whereas NID 3 can control a relatively smaller number of TCP connections in fast-path.

Although the above-described mechanism involving two hash functions works adequately well in many situations, the host stack must generate a hash value from the socket address of an incoming packet to be slow-path processed on the host. This involves execution of multiple software instructions by the host CPU.

Figure 14:
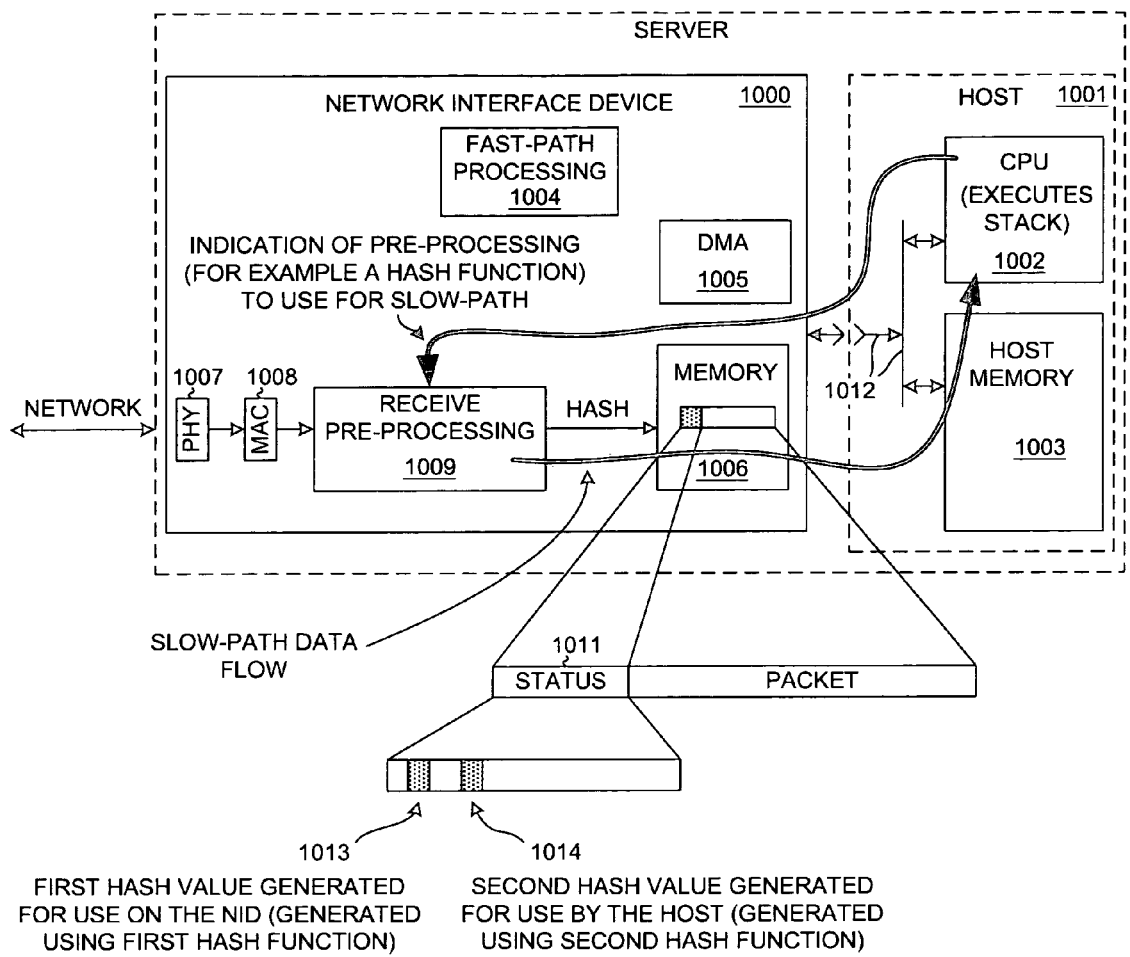
FIG. 14 is a simplified diagram illustrating a NID that: 1) uses a first hash function to generate a first hash value that the NID uses to identify a TCB for a fast-path packet, and 2) uses a second hash function to generate a second hash value that the host uses to identify a TCB for a slow-path packet in accordance with one embodiment of the present invention.

FIG. 14 is a simplified diagram of a network interface device (NID) 1000 and a host 1001 in accordance with an embodiment of the present invention. Host includes a CPU 1002 and host memory 1003. The TCBs for the TCP connections to be handled by the host CPU 1002 in slow-path are maintained in host memory 1003. NID 1000 includes, in addition to other parts not shown, a fast-path processing capability 1004, a DMA capability 1005, a memory 1006, a PHY 1007, a MAC 1008 and a receive pre-processing capability 1009. As described above in connection with FIG. 1, each incoming packet is analyzed and a hash value 1013 is generated on NID 1000 from the packet's socket address. In the discussion of FIG. 14, this hash value is called the first hash value. It is generated using a first hash function that is used on NID 1000. If the packet is a fast-path candidate, then the first hash value is used by the fast-path processing capability 1004 to look into a hash table on NID 1000 and to find a TCB maintained on the NID that is associated with the socket address of the incoming packet. NID 1000 then performs all or substantially all TCP processing on the packet. For additional detail on how the first hash is used in one embodiment, see the above description of FIGS. 1 and 2.

In the embodiment of FIG. 14, host forwards to NID 1000 over bus 1012 an indication of a type of preprocessing that NID 1000 is to perform on incoming packets. This indication may, for example, include an indication of a second hash function different from the first hash function. The second hash function is the hash function used by the host stack to identify TCBs stored on the host. In the event an incoming packet is not to be fast-path processed on NID 1000, then the packet together with a second hash value 1014 generated on the NID using the second hash function is forwarded to the host. FIG. 14 shows how this second hash value can be communicated to the host as part of status 1011 that is appended to the beginning of the packet. Both the packet as well as status 1011 that is appended to it are forwarded to host 1001. Host 1001, rather than generating its own hash value from the socket address of the packet to it, uses the second hash value provided to it by NID 1000. Host 1001 uses this second hash value to look up the TCB on the host that is associated with the TCP connection identified by the socket address of the packet. By having NID 1000 perform the processing involved in generating the second hash value that the host CPU 1002 would otherwise have had to do, less processing has to be performed by host CPU 1002. Developers of the host stack can therefore choose their own second hash function to be used by the host stack, whereas NID 1000 can employ a different first hash function that avoids the above-described funneling problem. The second hash function can, for example, be a general purpose hashing function which if used on NID 1000 to identify TCBs for fast-path packets in a file server application would result in the funneling problem described above in connection with FIG. 12.

Although the particular hash function set forth above in connection with FIG. 13 that avoids the funneling problem in the file server application of FIG. 11 happens to be an additive hash, other types of hash functions may be employed to avoid the described funneling problem. The hash function may, for example, be a rotating hash function involving an exclusive-ORing operation that is performed by a fly-by receive sequencer on a stream of incoming socket address bits. The hash function may involve exclusive-ORing an incoming address with a hash accumulation, then doing a one-bit rotate of the result, and then doing another exclusive-ORing operation, and so forth. The hash function may be performed by a hardwired receive fly-by sequencer, a micro-coded receive sequencer, a microprocessor, or dedicated hardware, or other circuitry or software or combinations of both. The hash function can involve swapping the lower eight bits of the SRCP with the upper eight bits, then performing a columnar add operation on the DSTIPL, DSTIPH, SRCIPL, SRCIPH, DSTP and the swapped SRCP values, and then taking bits twelve and thirteen of the resulting 16-bit sum and adding (sometimes called "folding") those two bit values to bits six and seven of the resulting 16-bit sum to generate the 12-bit hash value. The file "hashcode.txt" on the Compact Disc Appendix sets forth one possible hash function.

In some embodiments, the hash function performed by the NID to generate the hash values used in fast-path processing is programmable and is can be changed under the control of the host without rebooting the NID and without restarting all the software executing on the NID. In one embodiment, where the NID is operating in a first environment, the host controls the NID to use a first hash function that is more suitable for use in fast-path processing in the first environment, whereas if the NID is operating in a second environment, then the host controls the NID to use a second hash function that is more suitable for use in fast-path processing in the second environment. Where the receive sequencer is micro-coded, the host can control the NID to use one hash function or the other by determining which of two micro-coded instruction sequences the receive sequencer will use to generate the hash values. The host can load NID 1000 across bus 1010 with the micro-coded instructions which the receive processor or receive sequencer executes to calculate hash values. In some embodiments, the NID tries several hash functions for use in fast-path processing on the NID, and then picks the one hash function for longterm use in performing fast-path processing on the NID that results in the best fast-path TCB lookup performance. Network traffic can be monitored over time and the socket addresses of the traffic can be collected. Numerous hash functions can then be tested to determine which of the hash functions results in the most even spreading of the collected socket addresses over the available hash buckets on the NID.

Although the specific embodiment involves the TCP and IP protocols, the technique disclosed above for avoiding the funneling problem applies to other protocols as well, including, for example, the UDP protocol.

Accordingly, various modifications, adaptations, and combinations of various features of the described embodiments can be practiced without departing from the scope of the invention as set forth in the following claims.

What is claimed is:

1. A method of processing a plurality of packets, wherein each packet has a socket address, each socket address comprising a destination IP address, a source IP address, a destination TCP port address, and a source TCP port address, the method comprising:
   (a) generating on a network interface device a hash value from the socket address of each of the plurality of incoming packets, wherein each such hash value is associated with one of a plurality of hash buckets, each socket address comprising a plurality of high entropy bits and a plurality of low entropy bits, wherein the hash values resulting from changing the values of the high entropy bits are substantially evenly distributed among the plurality of hash buckets, and wherein the high entropy bits include at least the three least significant bits of the source TCP port address and at least the five least significant bits of the source IP address, and wherein the low entropy bits include essentially all the bits of each of the following: the destination IP address, the eight most significant bits of the source IP address, and the destination TCP port address, and wherein each hash bucket can contain up to X socket addresses, and wherein there are Y hash buckets, and wherein X*Y is 2E32 or less;
   (b) receiving onto a network interface device a first incoming packet of the plurality of packets and generating therefrom a first hash value as set forth above in (a);
   (c) using the first hash value to determine that a TCP connection identified by the socket address of the first incoming packet is a TCP connection being handled by the network interface device, and performing on the network interface device substantially all TCP and IP protocol processing on the first incoming packet;
   (d) receiving onto the network interface device a second incoming packet of the plurality of packets and generating therefrom a second hash value as set forth above in (a); and
   (e) using the second hash value to determine that a TCP connection identified by the socket address of the second incoming packet is a TCP connection not being handled by the network interface device, and forwarding the second packet to a host computer for TCP and IP protocol processing on the host computer.

2. The method of claim 1, wherein the host computer and the network interface device together comprise a file server, the file server being coupled to a plurality of client computers, the file server and the client computers being part of a single network, the file server receiving TCP/IP packets from each of the client computers, each of the TCP/IP packets having a socket address, and wherein a low entropy bit is a socket address bit whose value is the same in each TCP/IP packet received onto the file server from the plurality of client computers regardless of which of the client computers sent the TCP/IP packet to the file server.

3. The method of claim 1, wherein the hash value is generated in step (a) by mirroring a portion of the source TCP port address.

4. The method of claim 3, wherein the portion comprises the three least significant bits of the TCP port address.

5. The method of claim 1, wherein the hash value is generated in step (a) by mirroring a portion of the source IP address.

6. The method of claim 5, wherein the portion comprises the five least significant bits of the source IP address.

7. The method of claim 1, wherein the value X is fixed, and wherein none of the hash buckets can contain more than X socket addresses.

8. The method of claim 1, wherein a first hash function is used to generate the first and second hash values, the method further comprising:
   (f) using a second hash function to generate a third hash value from the second packet; and
   (g) forwarding the third hash value to the host along with the packet.

9. The method of claim 8, wherein the host computer maintains a plurality of blocks of TCP connection state information, each of the blocks being associated with a differnet TCP connection, and wherein one of the blocks is associated with the second packet, the method further comprising:
   using the third hash on the host computer to identify said one block associated with the second packet.

10. A method, comprising:
    (a) receiving a TCP/IP packet onto a TCP offload network interface device, the TCP/IP packet including a destination IP address, a destination TCP port address, a source IP address, and a source TCP port address, wherein the source TCP port address has a plurality of least significant bits A, each of the bits A occupying a different bit position, and wherein the source IP address has a plurality of least significant bits B, each of the bits B occupying a different bit position;
    (b) reordering at least a portion of the source TCP port address to generate a reordered source TCP port address, wherein none of the plurality of bits that were the least significant bits A of the source TCP port address before the reordering occupies the same bit position as any of the plurality of least significant bits B of the source IP address;
    (c) generating a hash value by combining the reordered source TCP port address with at least a portion of the source IP address such that each respective one of the bits of the reordered source TCP port address is combined with a respective corresponding one of the bits of the source TCP port address; and
    (d) using the hash value on the TCP offload network interface device to identify a block of TCP connection state information stored on the TCP offload network interface device.

11. The method of claim 10, wherein the TCP/IP offload network interface device is part of a file server, and wherein the combining involves:
    adding the reordered source TCP port address to the portion of the source IP address, wherein the reordered source TCP port address is a sixteen bit value, and wherein the portion of the source IP address is a sixteen bit value.

12. The method of claim 10, wherein the TCP/IP offload network interface device is part of a file server, and wherein the combining involves:
    exclusive-ORing the reordered source TCP port address with the portion of the source IP address, wherein the reordered source TCP port address is a sixteen bit value, and wherein the portion of the source IP address is a sixteen bit value.

13. The method of claim 10, wherein the reordering is a mirroring operation.

14. The method of claim 10, wherein the TCP offload network interface device is coupled to a host computer, the TCP offload network interface device and the host computer together comprising a server, wherein the host computer executes a protocol processing stack that controls a TCP connection, a second TCP/IP packet being received onto the TCP offload network interface device, the host computer receiving the second TCP/IP packet from the TCP offload network interface device and generating therefrom a second hash value, the stack using the second hash value to identify a block of TCP state information stored on the host computer, the block of TCP state information on the host computer being associated with the TCP connection, wherein the hash value generated in (c) has a fewer number of bits than the second hash value.

15. The method of claim 10, wherein a change in any one of the bits A or bits B results in a change in the hash value.

16. A method, comprising:
  (a) receiving a TCP/IP packet onto a TCP offload network interface device, the TCP/IP packet including a destination IP address, a destination TCP port address, a source IP address, and a source TCP port address, wherein the source TCP port address has a plurality of least significant bits A, each of the bits A occupying a different bit position, and wherein the source IP address has a plurality of least significant bits B, each of the bits B occupying a different bit position;
  (b) reordering at least a portion of the source IP address to generate a reordered source IP address, wherein none of the plurality of bits that were the least significant bits B of the source IP address before the reordering occupies the same bit position as any of the plurality of least significant bits A of the source TCP port address;
  (c) generating a hash value by combining at least a portion of the reordered source IP address with the source TCP port address such that each respective one of the bits of the portion of the reordered source IP address is combined with a respective corresponding one of the bits of the source TCP port address; and
  (d) using the hash value on the TCP offload network interface device to identify a block of TCP connection state information stored on the TCP offload network interface device.

17. The method of claim 16, wherein the TCP/IP offload network interface device is part of a file server, and wherein the combining involves:
  adding the portion of the reordered source IP address to the source TCP address, wherein the portion of the reordered source IP address is a sixteen bit value, and wherein the portion of the source TCP port address is a sixteen bit value.

18. The method of claim 16, wherein the TCP/IP offload network interface device is part of a file server, and wherein the combining involves:
  exclusive-ORing the portion of the reordered source IP address with the source TCP port address, wherein the portion of the reordered source IP address is a sixteen bit value, and wherein the source TCP port address is a sixteen bit value.

19. The method of claim 16, wherein the reordering is a mirroring operation.

20. The method of claim 16, wherein the TCP offload network interface device is coupled to a host computer, the TCP offload network interface device and the host computer together comprising a server, wherein the host computer executes a protocol processing stack that controls a TCP connection, a second TCP/IP packet being received onto the TCP offload network interface device, the host computer receiving the second TCP/IP packet from the TCP offload network interface device and generating therefrom a second hash value, the stack using the second hash value to identify a block of TCP state information stored on the host computer, the block of TCP state information on the host computer being associated with the TCP connection, wherein the hash value generated in (c) has a fewer number of bits than the second hash value.

21. The method of claim 16, wherein a change in any one of the bits A or bits B results in a change in the hash value.

* * * * *